United States Patent [19]

Schroeder

[11] 3,818,504

[45] June 18, 1974

[54] PORTABLE SOUND RECORDING AND REPRODUCING APPARATUS

[75] Inventor: Erich Schroeder, Nuremberg, Germany

[73] Assignee: Grundig Elektro-Mechanische Versuchsanstalt Max Grundig, Furth/Bay, Germany

[22] Filed: Jan. 27, 1972

[21] Appl. No.: 221,231

[30] Foreign Application Priority Data

Jan. 27, 1971 Germany............................ 2103659

[52] U.S. Cl............................................. 360/96

[51] Int. Cl............................................. G11b 5/00

[58] Field of Search.................... 274/4 C, 4 D, 4 E; 179/100.2 Z; 242/198–201

[56] References Cited

UNITED STATES PATENTS

| | | | |
|---|---|---|---|
| 3,632,113 | 1/1972 | Nakamura | 274/4 D |
| 3,719,364 | 3/1973 | Hessland et al. | 274/4 E |
| 3,724,858 | 4/1973 | Martin | 274/4 E |

*Primary Examiner*—Harry N. Haroian

*Attorney, Agent, or Firm*—Michael S. Striker

[57] ABSTRACT

A miniature tape recorder wherein the chassis supports a reciprocable carrier for a pressing roll and one or more magnetic heads. A selector knob is movable by one finger of the hand which grasps the chassis to effect movements of the roll between a first position of engagement with magnetic tape in an inserted cassette so that the tape is urged against a driven sound shaft and a second position at a short distance from the sound shaft. A cover which is pivoted to the chassis is movable by a spring-biased lever from a closed position to an open position in response to movement of the selector knob to an ejecting position whereby the cover moves the carrier with the roll and the head or heads to a retracted third position in which such parts cannot interfere with insertion or removal of cassettes. At the same time, the cover effects an at least partial expulsion of an inserted cassette from the chassis. When the cover is returned to its closed position, the roll and the head or heads automatically reassume their second positions.

12 Claims, 4 Drawing Figures

PORTABLE SOUND RECORDING AND REPRODUCING APPARATUS

BACKGROUND OF THE INVENTION

The present invention relates to sound recording and/or reproducing apparatus in general, and more particularly to improvements in portable tape recorders, especially to miniature tape recorders.

In presently known tape recorders which employ cassettes or analogous containers for magnetic tape, the pressing roll or rolls (which serve to press the tape against the rotating capstan) and the magnetic head or heads must be moved through a considerable distance whenever the user wishes to insert a cassette into or to remove a cassette from the housing or chassis of the tape recorder. As a rule, the pressing roll or rolls and the magnetic head or heads extend well into the interior of a properly mounted cassette when the tape recorder is ready for use so that the actuating means (such as one or more knobs, pushers, buttons or the like) must be moved through a considerable distance in order to retract the roll or rolls and the head or heads prior to withdrawal of a cassette as well as subsequent to insertion of a fresh cassette. This presents problems, especially in battery-operated miniature tape recorders which are intended to be held in one hand and to be manipulated by one or more fingers of the one hand. The pressing roll or rolls are necessary component parts of miniature tape recorders which are designed for the recordal and reproduction of music and normally further comprise a flywheel and a sound shaft. The shifting of a knob, pusher or slide through considerable distances is inconvenient if the shifting is to be performed by a finger of the hand which holds the housing of the tape recorder. On the other hand, if the tape recorder is provided with a mechanism which augments the movement of the knob or slide so as to insure that a relatively short displacement of the finger-operated part will effect a larger displacement of a pressing roll and/or a magnetic head, the displacement of the finger-operated part normally necessitates the exertion of a substantial force which is undesirable for obvious reasons. The situation is further aggravated if the finger-operated part must effect substantial displacements of a large number of components, for example, a pressing roll, two or more magnetic heads and one or more tape guiding forks or the like.

SUMMARY OF THE INVENTION

An object of the invention is to provide a portable sound recording and/or reproducing apparatus (hereinafter called tape recorder or miniature recorder) wherein the parts which must move away from the tape prior to removal and toward the tape subsequent to insertion of a supply of tape need not be manually moved through a substantial distance but are still incapable of interfering with proper insertion or removal of tape.

Another object of the invention is to provide a tape recorder wherein all operations which are to be performed prior to insertion of a supply of tape, in actual use of the recorder and/or prior to removal of a supply of tape can be effected with a single finger of the hand which holds the recorder and with the exertion of a minimal effort.

A further object of the invention is to provide a tape recorder wherein the movable door or cover which normally conceals a supply of tape when the recorder is in use performs additional important, advantageous and unobvious functions.

The invention is embodied in a portable sound recording and/or reproducing apparatus, particularly in a miniature tape recorder which can be grasped and manipulated by one hand. The apparatus comprises a chassis or housing defining a chamber or space for reception of removable cassettes or analogous containers for magnetic tape, a carrier which is mounted in the housing for movement between first, second and third positions, at least one pressing member (e.g., a roll) and at least one magnetic head member supported by the carrier and arranged to engage the tape in an inserted container in the first position of the carrier, these members being respectively moved through a relatively short and a relatively long distance in response to movement of the carrier between its first and second and its second and third positions respectively, a rotary sound shaft mounted in the housing and cooperating with the pressing member to drive the tape in the first position of the carrier, displacing means (which preferably constitutes a pivotable cover for an open side of the housing) which is movable between two spaced positions to thereby effect a movement of the carrier between its second and third positions, and manually operated selector means for effecting movements of the carrier between its first and second positions as well as for initiating the movement of the displacing means from that one of its two spaced positions which corresponds to the second position of the carrier. Thus, when the selector means permits it, the displacing means is caused to automatically leave its one position and to assume its other position with attendant movement of the carrier from its second to its third position in which the pressing member and the head or heads cannot interfere with insertion or removal of containers from the housing. When the displacing means is returned to its one position, it causes the carrier to reassume its second position in which the pressing member and the head or heads on the carrier are closely adjacent to the tape in an inserted container so that relatively short displacements of the selector means by one finger of the hand which grasps the housing suffice to move the carrier to its first or second position.

The displacing means may further serve to at least partially expel a container from the housing in response to movement to its other position under the action of a spring-biased lever or analogous moving means.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 2:
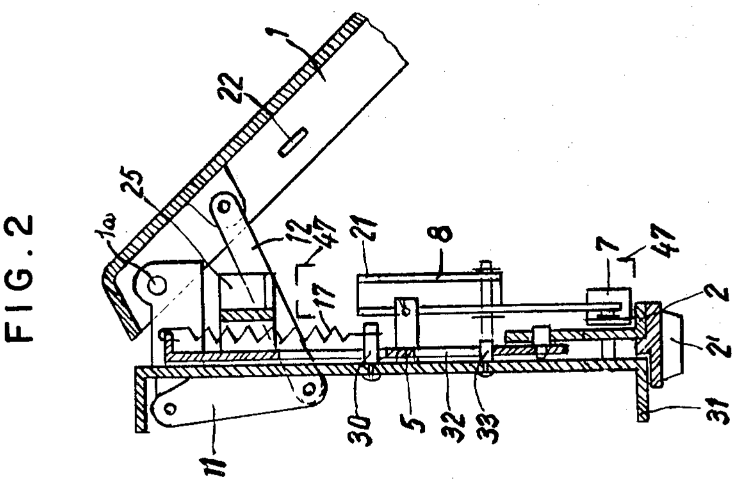
FIG. 2 is a sectional view as seen in the direction of arrows from the line A—A of FIG. 1.
Figure 1:
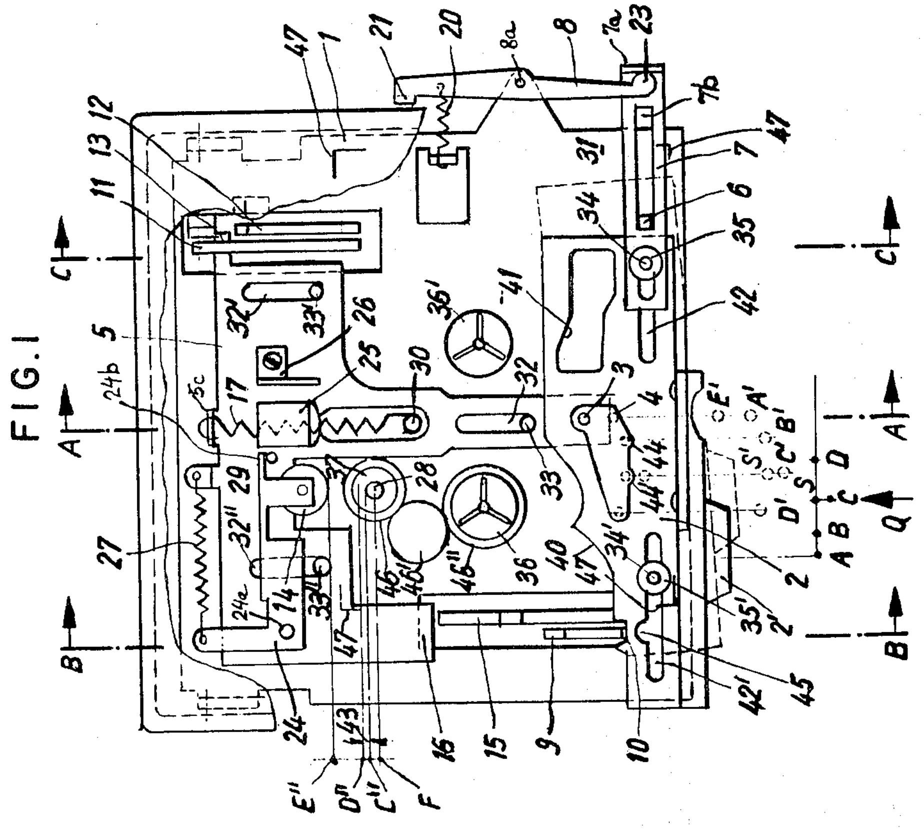
FIG. 1 is a plan view of a portable miniature tape recorder which embodies the invention, with a portion of the cover broken away.

Referring first to FIGS. 1 and 2, there is shown a miniature tape recorder which comprises a housing here shown as a frame or chassis 31 and a door or cover 1 which is pivotally mounted on the chassis, as at 1*a*. The lower side wall of the chassis 31, as viewed in FIGS. 1 and 2, is provided with a slot for a manually operated actuating member 2′ in the form of a slidable knob which can be moved by a single finger (preferably the thumb) of the hand which holds the chassis 31. The knob 2′ is movable by hand between five different positions which are indicated at A, B, C, D and S and in each of which certain parts of the tape recorder assumes different positions and are ready to perform certain predetermined functions. The knob 2′ is coupled to a motion transmitting member or slide 2 which is reciprocable in the chassis 31 and transmits motion to various components in response to displacement of the knob 2′ with reference to the chassis 31. The parts 2 and 2′ together constitute a selector which is movable by a single finger between the five closely adjacent positions A–D and S.

Figure 3:
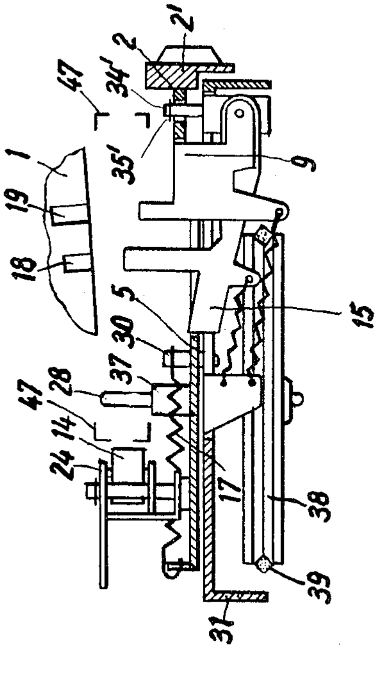
FIG. 3 is a sectional view as seen in the direction of arrows from the line B—B of FIG. 1.

When the knob 2′ is moved to its leftmost position A (as viewed in FIG. 1), the door 1 is automatically unlocked and is automatically moved to a partly or fully open position (see FIG. 2) so as to allow for convenient insertion or removal of a container or cassette 47 for magnetic tape (only the outlines of such cassette are indicated in FIGS. 1, 2 and 3 for the sake of clarity). The cassette 47 is receivable in a space or chamber (not specifically identified) which is defined therefor by the chassis 31. Such space is accessible for insertion or removal of cassettes 47 in the open position of the cover 1.

When moved to the position B, the knob 2′ maintains the movable parts of the tape recorder in their idle positions, i.e., the motor which transports the tape in a properly inserted cassette 47 is idle and the transport of tape in an inserted cassette 47 is discontinued.

In the position C, the knob 2′ maintains the parts of the tape recorder in a position of readiness for the reproduction or recordal of sound on magnetic tape in an inserted cassette 47.

By pressing upon the knob 2′ (arrow Q in FIG. 1) the user can move the knob to the position S which is the rapid stop position, i.e., a pressing roll 14 is moved away from the tape through a short distance so that the tape ceases to move lengthwise while an advancing member here shown as a sound shaft 28 continues to rotate if the motor is on. The knob 2′ returns to the position C as soon as the pressure in the direction of arrow Q is relaxed or terminated.

In the right-hand end position D, the knob 2′ causes the motor of the tape recorder to rapidly transport the tape rearwardly, i.e., to quickly rewind the tape onto the supply spool or reel in the cassette 47.

If the knob 2′ is moved from the position B to the position A, the slide 2 shares such movement of the knob to assume the position shown in FIG. 1. During such movement of the knob 2′, a cam face 4 of the slide 2 travels along and displaces a pin- or roller-shaped follower 3 which then assumes the broken-line position A′. At the same time, a forwardly extending projection or tooth 6 at the right-hand end of the slide 2 (as viewed in FIG. 1) entrains a coupling member 7 so that a bent-over lug 7*a* of the member 7 pivots a two-armed locking lever 8 which is fulcrumed in the chassis 31, as at 8*a*. The tooth 6 extends into an elongated slot 7*b* of the coupling member 7 and the upper arm of the locking lever 8 (as viewed in FIG. 1) has a projection 21 which is withdrawn from the slot 22 of the cover 1 when the coupling member 7 is moved in response to shifting of the knob 2′ from the position B to the position A. Thus, as soon as the follower 3 assumes the position A′, the cover 1 is free to pivot to the open position of FIG. 2 in response to pivoting of a spring-biased moving lever 9 shown in the lower left-hand portion of FIG. 1 and in FIG. 3. A portion of the moving lever 9 then extends into a recess or notch 10 of the slide 2 so that the latter is held against accidental movement from the position A shown in FIG. 1. The aforementioned follower 3 is mounted on an arm of a reciprocable carrier 5 which supports the pressing roll 14 and moves the latter radially of and away from the sound shaft 28 while the follower 3 tracks the cam face 4 in response to movement of the knob 2′ to the position A of FIG. 1. The moving lever 9 extends into the notch 10 and holds the slide 2 in the position of FIG. 1 as long as the cover 1 remains in the open position. The position shown in FIG. 2 is a partly open position of the cover 1; this cover can be pivoted by hand in a counterclockwise direction, as viewed in FIG. 2, so as to assume a fully open position in which the cassette 47 can be even more readily inserted into or withdrawn from the chamber or space in the chassis 31. During movement to the fully open position, the cover 1 pivots a lever 11 by way of a link 12 whereby the lever 11 engages a projection 13 of the carrier 5 and moves the latter upwardly, as viewed in FIG. 1, so that the follower 3 assumes the solid-line position in which it is disengaged from the cam face 4 of the slide 2. It will be noted that the FIGS. 2 and 1 respectively show the cover 1 in the partly open and fully open positions. The solid-line position of the follower 3 is indicated at E′. In such position of the follower 3, the roll 14 assumes the position E″ at a maximum distance from the sound shaft 28. An arresting lever 15 which is mounted in the chassis 31 then extends into the path of movement of an arm 16 of the carrier 5 and holds the latter against movement in a downward direction, as viewed in FIG. 1. The carrier 5 is biased downwardly by a helical spring 17 which is coupled to a post 30 of the chassis 31 and to a lug 5c of the member 5.

The cover 1 is returned to the closed position in response to insertion, removal or replacement of the cassette 47. During closing, a projection 18 of the cover 1 (see FIG. 3) engages the arresting lever 15 and moves the latter out of the path of the arm 16 so that the spring 17 is free to contract and to return the follower 3 into engagement with the cam face 4 of the slide 2. The projection 18 may constitute an integral tooth or rib of the cover 1. As the cover 1 continues to pivot toward its closed position, a second projection or rib 19 (FIG. 3) on the cover engages and pivots the moving lever 9 so that the latter is expelled from the notch 10 and permits a movement of the knob 2′ and slide 2 from the position A. When the cover 1 reaches the closed position of FIG. 4, the projection 21 of the locking lever 8 reenters the slot 22 to lock the cover in the closed position. The projection 21 is permanently biased toward engagement with the cover 1 by a helical spring 20 (FIG. 1) which is connected between the chassis 31 and the upper arm of the locking lever 8. The lower arm 23 of the lever 8 then moves the coupling member 7 in a direction to the right, as viewed in FIG. 1, so that the member 7 entrains the projection 6 and causes the slide 2 to move the knob 2' to the position B. This causes the follower 3 of the carrier 5 to enter a depression or detent notch 44 of the cam face 4 under the action of the spring 17. Such position of the follower 3 is denoted by the reference character B'.

It will be noted that, when the cover 1 is moved to the open position of FIG. 1, the carrier 5 is caused to move through a relatively long distance against the opposition of the spring 17 (i.e., upwardly, as viewed in FIG. 1) whereby the pressing roll 14 assumes the position E'' and is sufficiently remote from the sound shaft 28 to permit unobstructed insertion or removal of a cassette 47. The same holds true for a magnetic head 25 which is also mounted on the carrier 5. When the cover 1 returns to the closed position of FIG. 4 and is locked by the lever 8, the pressing roll 14 assumes a position D'' which is remote from the position E'' but is closely adjacent to a third position C'' in which the roll 14 cooperates with the sound shaft 14 to transport the tape lengthwise. During movement of the carrier 5 in response to closing of the cover 1, the parts 14 and 25 enter suitable cutouts or windows (not shown) which are provided in the adjacent end wall of a properly inserted cassette 47. The relatively short movements of the carrier 5 to move the pressing roller 14 between the positions C'' and D'' are effected by the selector means 2, 2'. The relatively long movements of the carrier 5 to move the pressing roll 14 between the positions D'' and E'' are effected by the cover 1 when the knob 2' dwells in the position A. It will be seen that the cover 1 constitutes a displacing device which can move the carrier 5 through a relatively long distance and that the relatively short movements of the carrier are effected by the knob 2' and slide 2, i.e., in direct response to manual operation of the selector means. The lever 11 and/or the link 12 may serve as an ejector means for automatically effecting an at least partial expulsion of a cassette 47 from its chamber or space in the chassis 31 in response to movement of the cover 1 to the fully open position of FIG. 1. Therefore, the position A of the knob 2' can be said to be an ejecting or expelling position.

Figure 4:
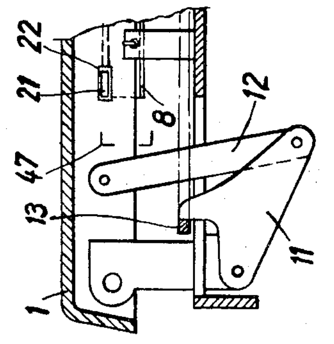
FIG. 4 is a fragmentary sectional view as seen in the direction of arrows from the line C—C of FIG. 1.

FIG. 1 shows the cover 1 in a fully open position; FIGS. 2 and 3 show the cover in a partly open position; and FIG. 4 shows the cover in closed position.

As mentioned before, the motor which drives the reels or spools in a properly inserted cassette 47 is idle when the knob 2' assumes the position B. The tape recorder is ready for recordal or reproduction of sound. The carrier 5 dwells in its lower end position, as viewed in FIG. 1 (in which the follower 3 extends into a detent notch 44), so that the magnetic head 25 on the carrier 5 assumes an operative position. A bifurcated tape guiding member 26 on the carrier 5 also assumes an operative position and the pressing roll 14 is moved nearer to the sound shaft 28. The roll 14 is mounted on a bell crank 24 which is pivotally supported by the carrier 5, as at 24*a*. The bell crank 24 is biased in a clockwise direction, as viewed in FIG. 1, by a helical spring 27 which is attached to a post of the carrier 5 and tends to pivot the pressing roll 14 toward the sound shaft 28. The spring 27 is free to maintain the roll 14 in engagement with the tape so that the tape is pressed against the sound shaft 28 during the recordal or reproduction of sound. A stop pin 29 of the carrier 5 automatically moves the pressure roll 14 away from the tape and from the sound shaft 28 when the carrier 5 is moved by the slide 2 from its lower end position, i.e., from a position at a minimum distance from the knob 2'. In other words, the follower 3 on the carrier 5 must assume one of the positions B', C' in order to allow the pin 29 to permit the spring 27 to move the pressing roll 14 against the sound shaft 28. The carrier 5 is provided with parallel guide slots 32, 32', 32'' which respectively receive guide pins 33, 33', 33'' mounted on the chassis 31. These pin-and-slot connections insure that the carrier 5 is compelled to perform movements up and down, as viewed in FIG. 1. Analogously, the slide 2 is provided with elongated parallel guide slots 42, 42' for guide pins 34, 34' which are secured to the chassis 31. As shown in FIG. 1, the slide 2 is movable substantially at right angles to the direction of movement of the carrier 5. The disks 35, 35' on the guide pins 34, 34' prevent excessive tilting of the slide 2; in addition, the disk 35 prevents excessive tilting of the coupling member 7 with reference to the slide 2.

If the knob 2' is moved to the position S, the slide 2 places a second detent notch 44' of its cam face 4 into register with the follower 3 so that the latter enters the notch 44' under the action of the spring 17. At the same time, a notch 45 in the wall surrounding the slot 42' of the slide 2 moves into register with the guide pin 34'. If the operator releases the knob 2', the latter leaves the position S and assumes the position C whereby the guide pin 34' enters the notch 45. Such movement is imparted by the spring 17 which causes the follower 3 to bear against the surface surrounding the notch 44' in the cam face 4 so that the slide 2 causes the knob 2' to move to the position C as soon as the knob 2' is released in the position S. During movement under the action of the spring 17 and follower 3, the slide 2 pivots about the axis of the guide pin 34 in a counterclockwise direction, as viewed in FIG. 1, so that the pin 34' is free to enter the notch 45. The thus inclined positions of the knob 2' and slide 2 are indicated in FIG. 1 by phantom lines. The corresponding position of the follower 3 is indicated at C' below the position S' which latter corresponds to the position S of the knob 2'. In other words, once the knob 2' reaches the position S and the operator ceases to exert pressure in the direction indicated by arrow Q, the knob automatically assumes the position C under the action of the spring 17 and follower 3. The position C of the knob 2' would correspond to a theoretical position F of the pressing roll 14; however, the latter cannot reach the position F due to the presence of the sound shaft 28 so that the roll 14 assumes the operative position C'' in which it urges the magnetic tape against the sound shaft 28. The right-hand arm of the bell crank 24 is then disengaged from the stop 29 of the carrier 5 because, when the follower 3 dwells in the position C', the stop 29 is so close to the slide 2 that it is disengaged from the projection 24b of the bell crank 24 and the latter is free to maintain the roll 14 in engagement with the sound shaft 28, or with a tape between the parts 14, 28, under the action of the spring 27. The spring 27 is strong enough to insure that the tape is advanced in response to rotation of the sound shaft 28 when the follower 2 dwells in the position C′. The apparatus is ready for the recordal or reproduction of sound.

If the tape is to be arrested instantaneously, the just described procedure is reversed, i.e., the user must apply pressure in the direction of arrow Q to move the knob 2′ to the position S. This causes the pressing roll 4 to move away from the sound shaft 28 and the pull upon the magnetic tape between the parts 14, 28 is terminated.

If the knob 2′ is caused to move with the slide 2 to the position D (rearward transport of tape), the follower 3 is moved to the position D′ and the pressing roll 14 assumes the position D″. The projection 24*b* of the bell crank 24 abuts against the stop pin 29 and the small distance 43 between the sound shaft 28 and pressure roll 14 is sufficient to terminate the transport of magnetic tape. The rapid rewinding of tape takes place while the user continues to maintain the knob 2′ in the position D because a spring (not shown) permanently urges the parts 2 and 2′ to the position C.

The slide 2 is provided with two additional cams 40 and 41 which cause the parts of the recorder to perform additional functions in selected positions of the knob 2′. The exact nature of such functions forms no part of the present invention. The driving connection for normal operation (recordal or reproduction of sound) between the sound shaft 28 and the output member 36 which drives the left-hand reel of the cassette 47 (as viewed in FIG. 1) is established by way of a power train including the gears 46, 46′ and 46″. The gear 46 is coaxial with a gear or pulley 37 which is driven by the motor of the tape recorder (e.g., by a battery-operated electric motor). It is preferred to employ gears having a large number of minute teeth. A second output member 36′ for the right-hand reel of the cassette 47 (as viewed in FIG. 1) can be coupled with the motor of the tape recorder by means of a non-illustrated power train. Such power train is operative during rapid rewinding of tape (position D of the knob 2′). The flywheel 38 (FIG. 3) of the apparatus is driven by the motor through the intermediary of a V-belt 39.

An important advantage of the improved tape recorder is that a finger (preferably the thumb) of the hand which holds the chassis 31 can readily move the knob 2′ to any one of the closely adjacent positions A, B, C, D, S with the exertion of a minimal effort and by shifting the knob through short distances. The displacing means or cover 1 performs several functions, namely, to move the carrier 5 between the positions corresponding to the positions D″, E″ of the pressing roll 14, to pivot the levers 9, 15 during movement to the close position of FIG. 4, to protect the inserted cassette 47 in its closed position, to allow for unimpeded access to the chamber for cassettes 47, and to effect an at least partial ejection of a cassette by way of the part 11 and/or 12 during movement to its open position.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by letters patent is set forth in the appended claims:

1. In a portable sound recording and/or reproducing apparatus, particularly in a miniature tape recorder which can be grasped and manipulated by one hand, a combination comprising a housing defining a space for reception of removable containers for magnetic tape; carrier means mounted in said housing for movement between first, second and third positions; a pressing member and at least one magnetic head member supported by said carrier means and arranged to engage the tape in an inserted container in said first position of said carrier means, said members being respectively moved through a relatively short and a relatively long distance in response to movement of said carrier means between said first and second and said second and third positions thereof; a rotary advancing device mounted in said housing and cooperating with said pressing member to transport the tape lengthwise in said first position of said carrier means; displacing means comprising a cover secured to said housing and movable with reference thereto between a secured closed position, corresponding to said second position of said carrier means, in which said space is unaccessible for insertion or withdrawal of containers, and an open position, corresponding to said third position of said carrier means, in which said space is accessible for insertion or removal of containers, and manually operated selector means for moving said carrier means between said first, second, and third positions.

2. A combination as defined in claim 1, wherein the movement of said displacing means between said open and said closed position engagingly moves said carrier means between said third and said second positions respectively.

3. A combination as defined in claim 1, wherein said carrier means is reciprocable between said positions thereof and further comprising means for biasing said carrier means from said third position.

4. A combination as defined in claim 3, wherein said selector means is movable in said housing substantially at right angles to the direction of reciprocatory movement of said carrier means.

5. A combination as defined in claim 1, wherein said selector means is movable with reference to said housing between a plurality of positions including a first position in which the apparatus is ready for the reproduction or recordal of sound on magnetic tape in an inserted container, a second position in which the tape is being rapidly rewound in the inserted container, a third position in which the transport of tape is terminated, and a fourth position in which a container is at least partially expelled from said space.

6. A combination as defined in claim 5, wherein said selector means is movable by hand from said first position to a fifth position to thereby move said carrier means from said first to said second position thereof with attendant abrupt termination of lengthwise transport of tape.

7. A combination as defined in claim 1, further comprising locking means for automatically locking said displacing means in that one of said spaced positions thereof which corresponds to said second position of said carrier means, said selector means being movable by hand to a predetermined position to thereby disengage said locking means from said displacing means so that the latter is freed for movement to the other of said spaced positions thereof corresponding to said third position of said carrier means.

8. A combination as defined in claim 7, further comprising moving means for automatically moving said displacing means to said other position thereof in response to disengagement of said locking means.

9. A combination as defined in claim 8, wherein said displacing means is pivotable between said spaced positions thereof and said moving means comprises a spring-biased lever mounted in said housing.

10. A combination as defined in claim 8, further comprising ejector means for effecting an at least partial expulsion of a container from said housing in response to movement of said displacing means from said one toward said other position thereof.

11. A combination as defined in claim 10, wherein said ejector means comprises a linkage receiving motion from said displacing means.

12. A combination as defined in claim 1, further comprising a power train for transporting the tape in an inserted container in at least one predetermined position of said selector means, said power train comprising a plurality of mating gears having a plurality of minute teeth.

* * * * *